United States Patent [19]
Yajima et al.

[11] Patent Number: 6,148,110
[45] Date of Patent: Nov. 14, 2000

[54] IMAGE DATA PROCESSING APPARATUS AND METHOD

[75] Inventors: Tatsuo Yajima; Hiroshi Shirouzu; Shoko Kitajima, all of Fukuoka; Koji Yamaguchi, Kasuga, all of Japan

[73] Assignee: Matsushita Electric Industrial Co., Ltd., Osaka, Japan

[21] Appl. No.: 09/017,945

[22] Filed: Feb. 3, 1998

[30] Foreign Application Priority Data

Feb. 7, 1997 [JP] Japan ..................................... 9-024913

[51] Int. Cl.⁷ ....................................................... G06K 9/36
[52] U.S. Cl. ........................................... 382/240; 382/248
[58] Field of Search ................................... 382/240, 239, 382/238, 233, 248

[56] References Cited

U.S. PATENT DOCUMENTS

| | | | |
|---|---|---|---|
| 5,537,493 | 7/1996 | Wilkinson | 382/240 |
| 5,602,589 | 2/1997 | Vishwanath et al. | 382/240 |
| 5,881,176 | 3/1999 | Keith et al. | 382/240 |
| 5,926,791 | 7/1999 | Ogata et al. | 382/240 |

FOREIGN PATENT DOCUMENTS

8242450  9/1996  Japan .

*Primary Examiner*—Yon J. Couso
*Attorney, Agent, or Firm*—Stevens, Davis, Miller & Mosher, L.L.P.

[57] ABSTRACT

An image data processing apparatus includes a zero-value prediction compressor for compressing data by predicting a zero-value region of a high-layer from a low layer of a wavelet space and eliminating data in a space other than a meaningful space, a zero-value prediction expander for restoring data after wavelet transform from compressed data with the data in the space other than the meaningful space being eliminated, a subtracter for making a difference between sub-bands, and a differential accumulation buffer for accumulating the difference. In addition, a decoder is provided to have a zero-value prediction expander and a difference accumulation buffer. The decoder predicts a zero-value in a high frequency component to perform mask processing.

7 Claims, 12 Drawing Sheets

IMAGE DATA PROCESSING APPARATUS AND METHOD

BACKGROUND OF THE INVENTION

1. Field of the Invention

The present invention relates to image data processing apparatus and method for use in image compression processing or the like.

2. Description of the Related Art

The high-efficiency image coding technique, on condition that images are related to communication media and recording media, extensively exploits DCT (Discrete Cosine Transform) approaches. However, the compression method using DCT has an essential problem that the image compression rate is limited because block distortion, mosquito noise and so on are visually recognized when the rate is increased.

Thus, in recent years, innovative image compression methods have been proposed in order to raise the limitation of compression rate. Particularly, a compression technique using wavelet transform as a kind of sub-band encoding has been attracting a great deal of attention. Use of this wavelet transform which has no idea of blocks will visually improve picture quality to a great extent since there is no such interblock distortion as in DCT.

As compared with compressed image in wavelet transform, the compressed image in DCT has a digital tendency, and contains much high frequency components under high compression rate. As a result, the high frequency components are preserved, but contrarily constitute conspicuous distortion. On the other hand, the wavelet transform gives rise to compressed image of analog tendency, and the high frequency components are naturally decreased with the increase of compression rate. In other words, the compressed image gradually loses signal components from the high frequency components of the signal band, thus resolution being totally reduced. If the compression rate in wavelet transform is the same as in DCT, visual picture quality deterioration is less than in DCT.

Figure 12:
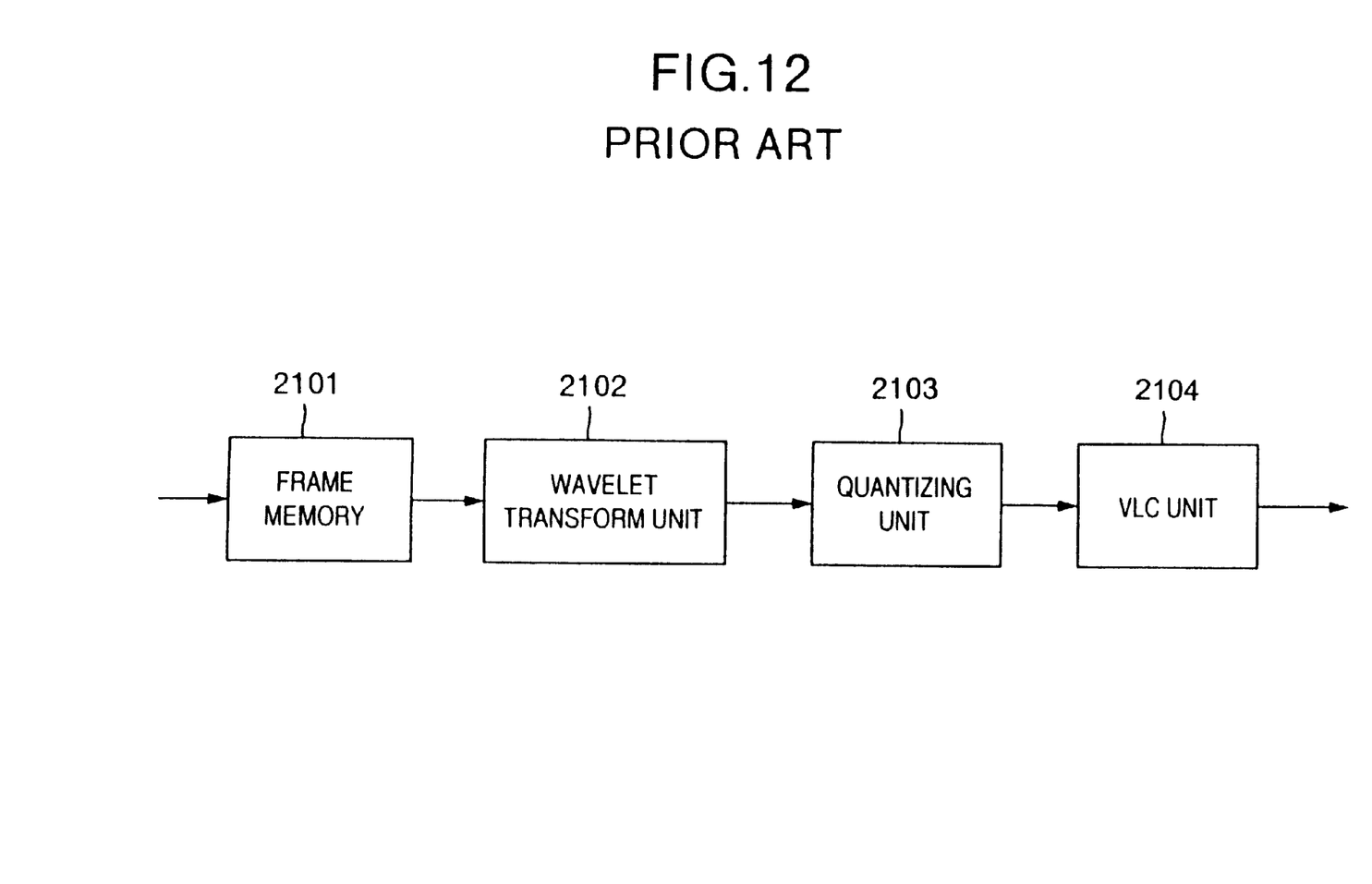
FIG. 12 is a block diagram showing the construction of a conventional wavelet image compression apparatus.

A conventional wavelet image compression apparatus will be described with reference to FIG. 12. When moving image data are compressed, input image data are supplied to a frame memory 2101, and the output data of the frame memory 2101 is fed to a wavelet transform unit 2102.

Figure 13:
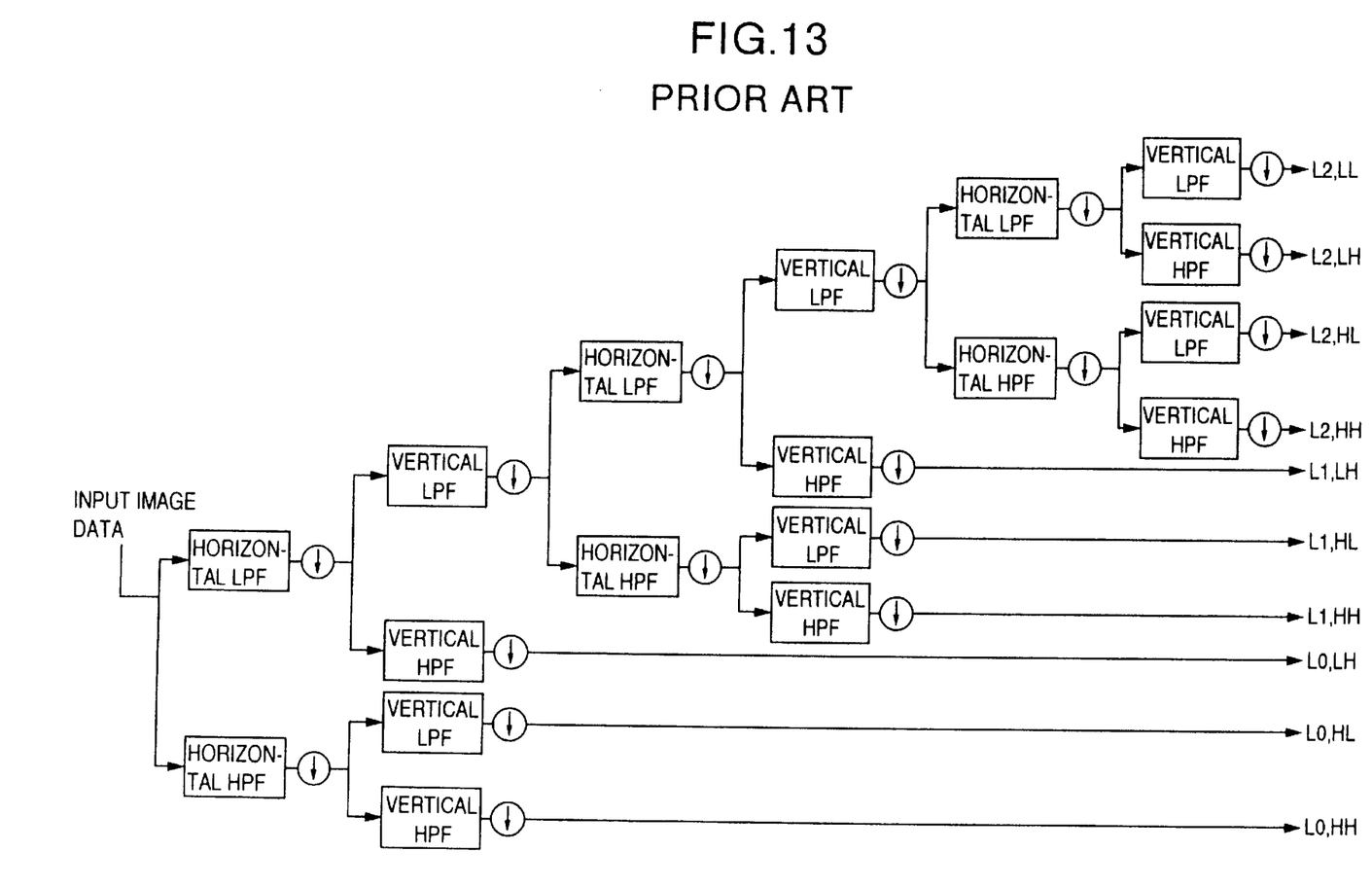
FIG. 13 is a block diagram showing the construction of a conventional wavelet image expansion apparatus.

Here, the wavelet transform will be mentioned. FIG. 13 is a block diagram showing the wavelet transform processing in the wavelet transform unit 2102. As illustrated in FIG. 13, the input image data is fed to horizontal low-pass filter (LPF) and high-pass filter (HPF), so that the horizontal frequency band is divided into two parts. Then, the amount of data of each part is thinned out by a down sampler (indicated by down arrow) to an extent of ½ with respect to time. The ½-thinned image data produced from the down sampler through the horizontal low-pass filter (LPF) is further supplied to vertical low-pass filter (LPF) and high-pass filter (HPF), so that the vertical frequency band is divided into two parts. Then, the amount of data of each part is thinned out by a down sampler (indicated by down arrow) to an extent of ½ with respect to time.

Layer-0 sub-band signals will be described. The image data, which are thinned out to ½ through the horizontal low-pass filter (LPF) and further thinned out to ½ through the next vertical high-pass filter (HPF), is taken as an L0, LH sub-band signal. The image data, which are thinned out to ½ through the horizontal high-pass filter (HPF) and further thinned out to ½ through the next vertical low-pass filter (LPF), is taken as an L0, HL sub-band signal. The image data, which are thinned out to ½ through the horizontal high-pass filter (HPF) and further thinned out ½ through the next vertical high-pass filter (HPF), is taken as an L0, HH sub-band signal.

The component, which is thinned out to ½ through the first-stage horizontal low-pass filter (LPF) and further thinned out to ½ through the next vertical low-pass filter (LPF), is again subjected to the same processing as above (layer-1 and layer-2). In other words, L1, LH; L1, HL and L1, HH indicate layer-1 sub-band signals, and L2, LH; L2, HL and L2, HH indicate layer-2 sub-band signals. FIG. 13 shows the situation in which the input image data are three times subjected to wavelet transform for convenience of explanation.

Figure 14:
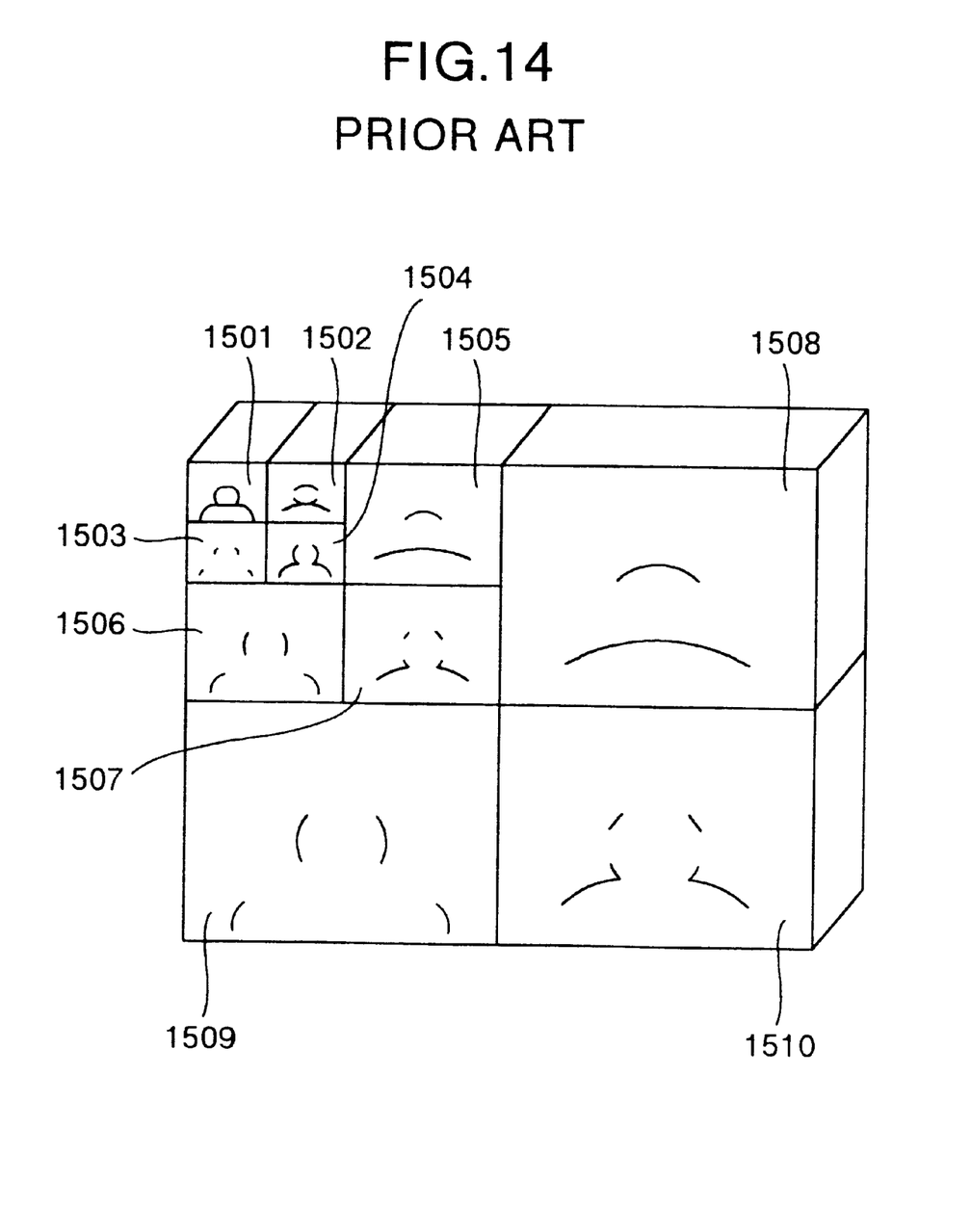
FIG. 14 is a diagram for explaining a wavelet space.

The repetition of such processing gives rise to coefficient components. The horizontal and vertical frequency bands are divided, and coefficient data, in which the amount of data is reduced to ½ along the low-frequency region, are accumulated. FIG. 14 is a diagram to which reference is made in explaining a wavelet space, or showing wavelet transform coefficient signals for a plurality of frequency bands. In FIG. 14, reference numeral 1501 denotes a layer-2 LL-component sub-band space, 1502 a layer-2 HL-component sub-band space, 1503 a layer-2 LH-component sub-band space, and 1504 a layer-2 HH-component sub-band space. Reference numerals 1505 to 1507 denote layer-1 HL-, LH- and HH-component sub-band spaces, respectively. Reference numerals 1508 to 1510 denote layer-0 HL-, LH- and HH-component sub-band spaces, respectively.

Referring back to FIG. 12, the coefficient for each frequency band, which is produced by the wavelet transform unit 2102 having the above feature, is quantized by a quantizing unit 2103. The output data of the quantizing unit 2103 are coded by a variable-length coding (VLC) unit 2104, so that more information is assigned to data which occur at higher probability. In this way, the amount of information about whole data is reduced, and the input image is compressed.

However, although there are a lot of zero-value areas in a high-frequency component image space in the wavelet transform, the conventional wavelet transform apparatus cannot effectively reduce the amount of data in the zero-value regions. The conventional apparatus simply reduces the amount of data by making the quantizing step rough in the whole areas of the space which includes much zero value. Since picture quality is deteriorated if compression rate is increased, high compression rate cannot be achieved.

SUMMARY OF THE INVENTION

It is an object of the present invention to provide image data processing apparatus and method capable of solving the above problem and achieving high compression rate.

According to the present invention, there is provided an image data processing apparatus which comprises: means for predicting a zero-value region of a high layer from a low layer; means for eliminating image data, which are predicted not to be important, among wavelet-transformed data; and means for restoring the wavelet-transformed data from the predicted image data with the unimportant portion being eliminated.

The first image data processing apparatus according to the present invention comprises: a zero-value region predictor having means for predicting a meaningful space of a high frequency sub-band from a low frequency sub-band of a wavelet space; and a zero-value region masking device for masking data in a space other than the meaningful space which is predicted by the zero-value region predictor. Thus, when an image of large interframe correlation is compressed, a zero-value region can be predicted in the space of high frequency component, and data in the predicted region can be eliminated from the compressed data, so that high compression of data can be achieved.

The second image data processing apparatus according to the present invention comprises: a first sub-band decomposer for performing sub-band decomposition to an image to be compressed and a plurality of sub-band decomposers for performing second and following sub-band decomposition; a zero-value region predictor including means for predicting a meaningful space of a high frequency sub-band from a low frequency sub-band of a wavelet space; a zero-value region masking device for masking data in a space other than the meaningful space predicted by the zero-value region predictor; a differential accumulation buffer for accumulating a low frequency differential sub-band signal by adding the low frequency differential sub-band signal to previous data; and a subtracter for taking a difference between a decoded restoration low frequency sub-band signal read out from the differential accumulation buffer and a low frequency sub-band signal output from the first sub-band decomposer, the differential sub-band low frequency component signal output from the subtracter being supplied to the sub-band decomposer for performing the second sub-band decomposition. Thus, since the sub-band decomposition is performed before taking a difference relative to the previous image, so that the image data are separated into low frequency (LL) sub-band data and high frequency sub-band data, and since mask data are produced only from the low frequency (LL) sub-band data, the mask data is precise, and thus mask processing can be performed effectively.

The third image data processing apparatus according to the present invention is an image expansion apparatus in an image data processing apparatus which comprises: a plurality of sub-band synthesizers for performing sub-band synthesis to dada which are compressed by wavelet-transformation; a zero-value region interpolator including means for assigning the data compressed by wavelet-transformation to only a meaningful space; and a differential accumulation buffer for accumulating a low frequency differential sub-band signal produced from the sub-band synthesizer by adding the low frequency differential sub-band signal to previous data, the decoded restoration low frequency sub-band signal read out from the differential accumulation buffer being supplied to one of the sub-band synthesizers, so that an image is restored. Thus, in the data expansion apparatus, it is possible to restore an original moving image from compressed moving image data produced by the second image data processing apparatus according to the present invention.

DESCRIPTION OF THE PREFERRED EMBODIMENTS

An embodiment of image data processing apparatus and method of the present invention will be described below.

Figure 1:
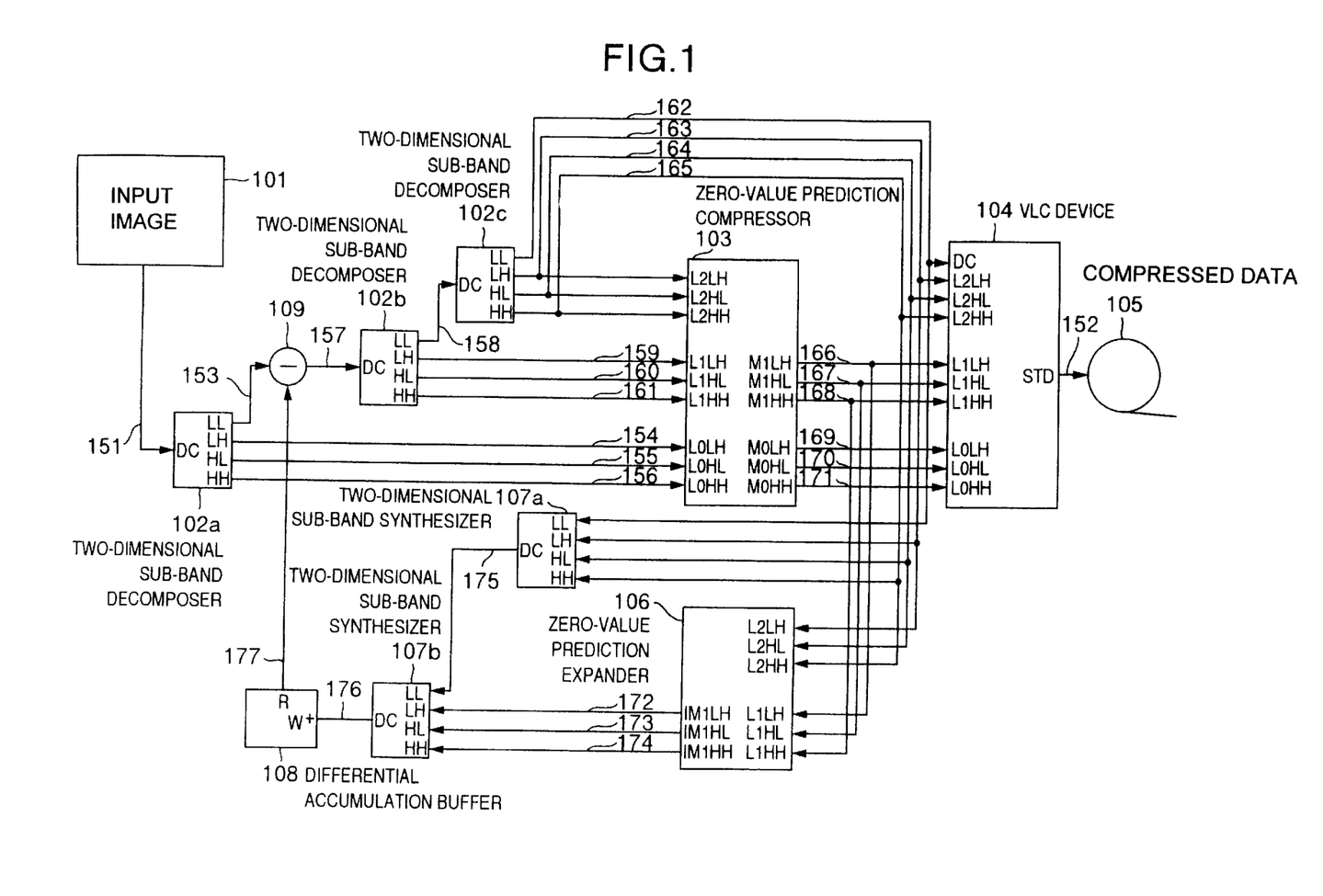
FIG. 1 is a block diagram showing the construction of an image compressing apparatus according to an embodiment of the present invention.

FIG. 1 is a block diagram showing the whole construction of an image compression apparatus in the image data processing apparatus according to the embodiment of the present invention. An image signal 151 is fed to the image compression apparatus, and a compressed signal 152 is output from the image compression apparatus. Reference numeral 101 denotes an input image, and 105 compressed data which are generated by the image compression apparatus.

Referring to FIG. 1, there are shown a layer-0 LL sub-band signal 153, a layer-0 LH sub-band signal 154, a layer-0 HL sub-band signal 155, a layer-0 HH sub-band signal 156, and a differential LL sub-band signal 157 output from a subtracter 109.

There are also shown a layer-1 LL sub-band signal 158, a layer-1 LH sub-band signal 159, a layer-1 HL sub-band signal 160, a layer-1 HH sub-band signal 161, a layer-2 LL sub-band signal 162, a layer-2 LH sub-band signal 163, a layer-2 HL sub-band signal 164, and a layer-2 HH sub-band signal 165.

There are also shown a layer-1 LH zero-value region prediction sub-band signal 166, a layer-1 HL zero-value region prediction sub-band signal 167, a layer-1 HH zero-value region prediction sub-band signal 168, a layer-0 LH zero-value region prediction sub-band signal 169, a layer-0 HL zero-value region prediction sub-band signal 170, and a layer-0 HH zero-value region prediction sub-band signal 171.

Moreover, there are shown a layer-1 LH restoration sub-band signal 172, a layer-1 HL restoration sub-band signal 173, and a layer-1 HH restoration sub-band signal 174 all of which are output from a zero-value prediction expander 106. In addition, there are shown a first restored DC component signal 175 which is output from a two-dimensional sub-band synthesizer 107a, a second restored DC component signal 176 which is output from a two-dimensional sub-band synthesizer 107b, and a decoded restoration LL sub-band signal 177 which is read out from a differential accumulation buffer 108.

The image compression apparatus comprises, as shown in FIG. 1, two-dimensional sub-band decomposers 102a, 102b and 102c, that is, the image compression apparatus has three stages of two-dimensional sub-band decomposers in all. The initial-stage (first-stage) two-dimensional sub-band decomposer 102a performs sub-band decomposition to an image to be compressed. The sub-band decomposers 102b and 102c are the second- and third-stages two-dimensional sub-band decomposers, respectively.

Figure 2:
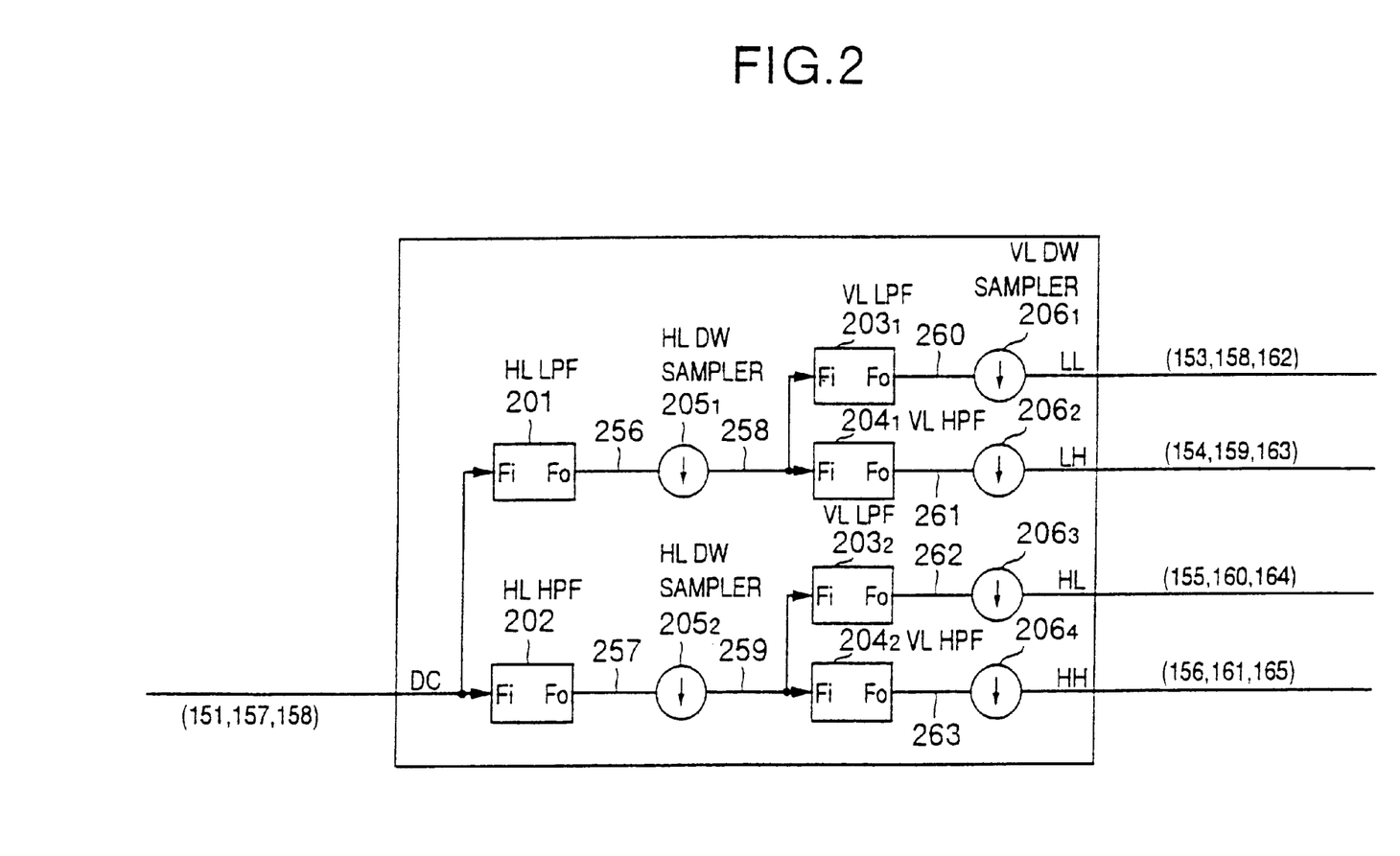
FIG. 2 is a block diagram showing the construction of a two-dimensional sub-band decomposer.

FIG. 2 is a block diagram showing the construction of each of the two-dimensional sub-band decomposers 102a, 102b and 102c. Each of the two-dimensional sub-band decomposers 102a, 102b and 102c includes a horizontal low-pass filter (HL LPF) 201, a horizontal high-pass filter (HL HPF) 202, horizontal down (HL DW) samplers $205_1$ and $205_2$, vertical low-pass filters (VL LPFs) $203_1$ and $203_2$, vertical high-pass filters (VL HPFs) $204_1$ and $204_2$, and vertical down (VL DW) samplers $206_1$ to $206_4$.

The two-dimensional sub-band decomposition processing is performed as follows. Horizontal component low frequency sub-band data 258 are produced by the horizontal low-pass filter 201 and the horizontal down sampler $205_1$ on the basis of input data. An LL component is produced by the vertical low-pass filter $203_1$ and the vertical down sampler $206_1$ on the basis of the horizontal component low frequency sub-band data 258, and an LH component is produced by the vertical high-pass filter $204_1$ and the vertical down sampler $206_2$ on the basis of the horizontal component low frequency sub-band data 258. Also, horizontal component high frequency sub-band data 259 are produced by the horizontal high-pass filter 202 and the horizontal down sampler $205_2$ on the basis of the input data. An HL component is produced by the vertical low-pass filter $203_2$ and the vertical down sampler $206_3$ on the basis of the horizontal component high frequency sub-band data 259, and an HH component is produced by the vertical high-pass filter $204_2$ and the vertical down sampler $206_4$ on the basis of the horizontal component high frequency sub-band data 259.

Figure 3:
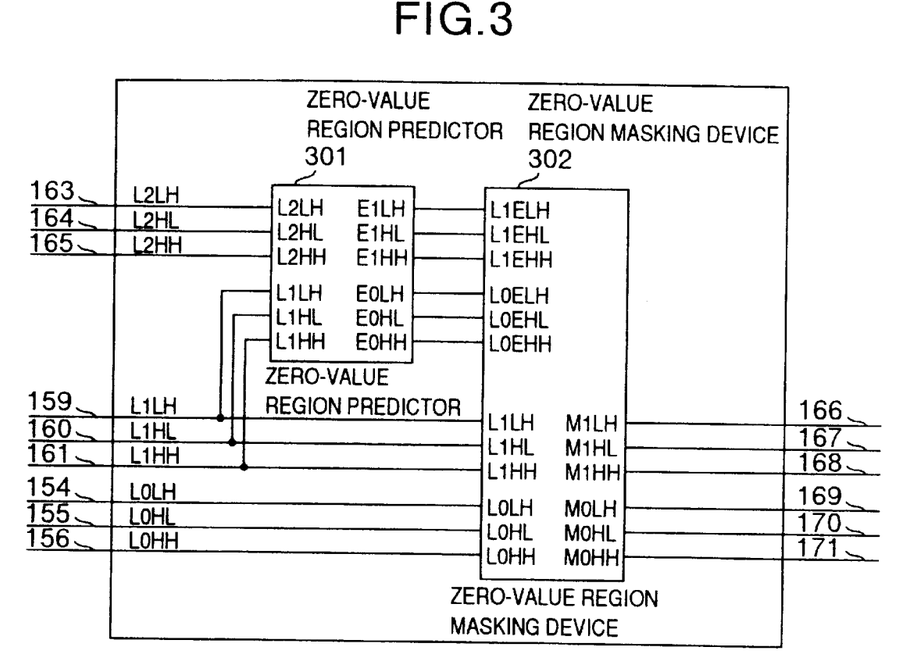
FIG. 3 is a block diagram showing the construction of a zero-value prediction compressor.

Referring back to FIG. 1, the image compression apparatus further comprises a zero-value prediction compressor 103 which includes means for predicting a meaningful space of a high frequency sub-band from a low frequency sub-band of a wavelet space, and means for masking data in a space other than the predicted meaningful space. FIG. 3 shows the detailed construction of the zero-value prediction compressor 103.

The operation of the zero-value region prediction compressor 103 will be described in detail referring to FIG. 3. A zero-value region predictor 301 of the zero-value prediction compressor 103 predicts the position of important data of layer-1 quantized sub-band data on the basis of the layer-2 quantized sub-band data 163, 164 and 165 (L2LH, L2HL and L2HH), and produces mask data indicating a region which does not include the predicted position, or layer-1 zero-value region prediction data (E1LH, E1HL and E1HH). Similarly, the zero-value region predictor 301 predicts a position of important data of layer-0 quantized sub-band data on the basis of the layer-1 quantized sub-band data 159, 160 and 161 (L1LH, L1HL and L1HH), and produces layer-0 zero-value region prediction data (E0LH, E0HL and E0HH) which indicate the predicted position.

In a zero-value region masking device 302, the layer-1 quantized sub-band data 159, 160 and 161 (L1LH, L1HL and L1HH) and the layer-0 quantized sub-band data 154, 155 and 156 (L0LH, L0HL and L0HH) are masked by a mask plane space 506 (see FIG. 11) which is formed by the layer-1 zero-value region prediction data (E1LH, E1HL and E1HH) and a mask plane space 406 (see FIG. 11) which is formed by the layer-0 zero-value region prediction data (E0LH, E0HL and E0HH). Thus, only the layer-1 and layer-0 quantized sub-band data which are not masked are produced as quantized mask sub-band data (M1LH:166, M1HL:167, M1HH:168, M0LH:169, M0HL:170 and M0HH:171).

Figure 10:
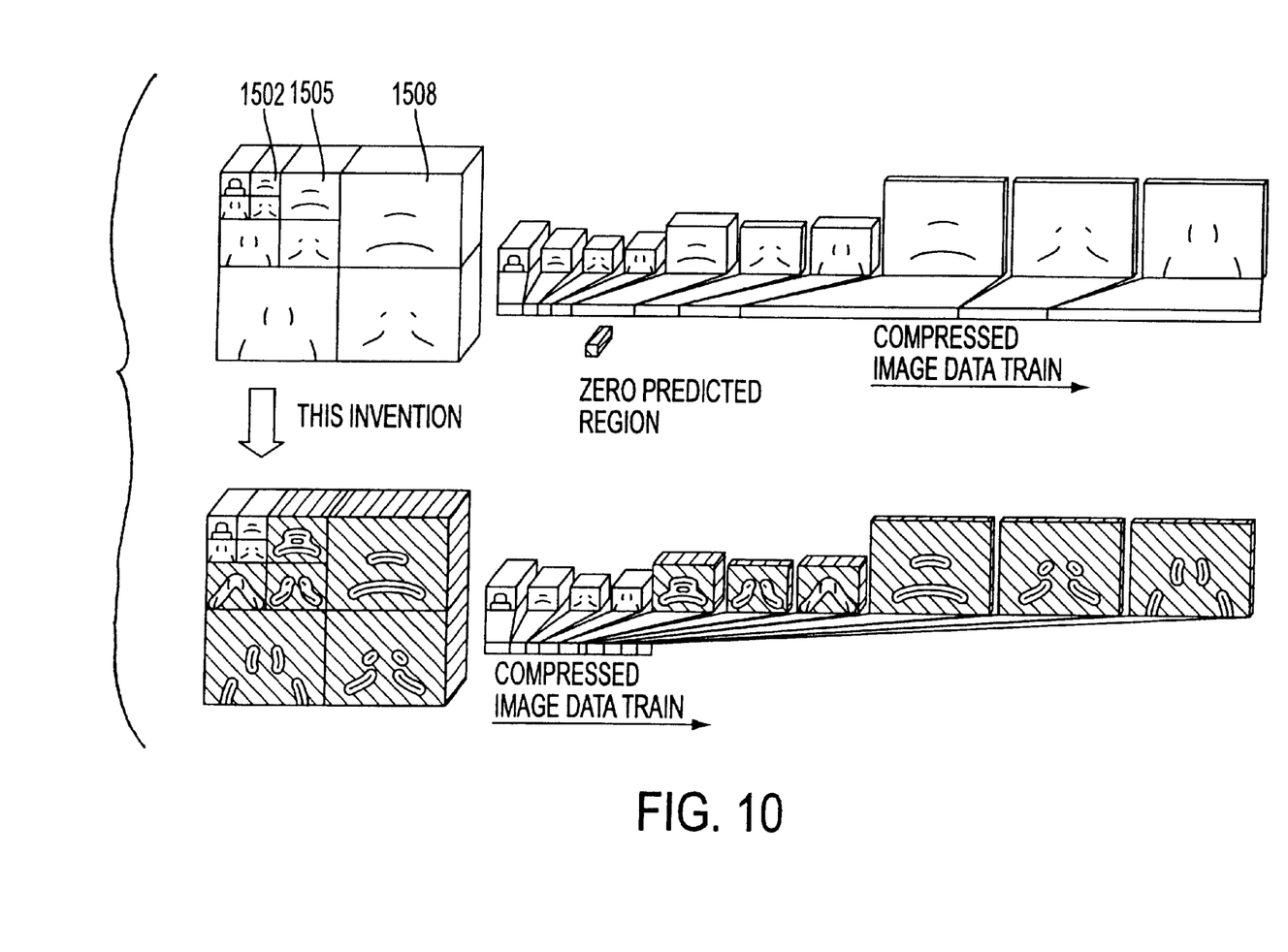
FIG. 10 is a diagram for explaining the effect of mask processing.
Figure 11:
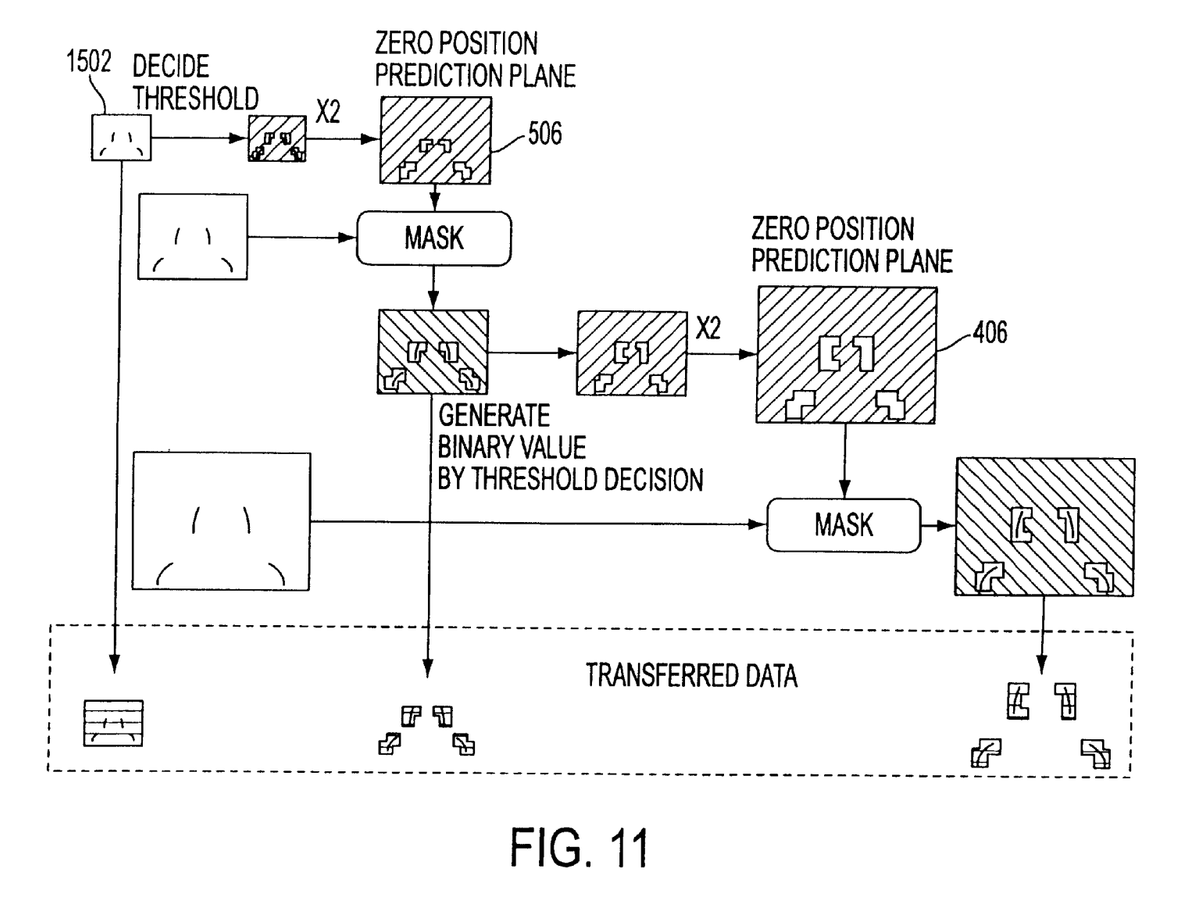
FIG. 11 is a diagram for explaining the zero-value predicting processing and mask processing.

FIG. 10 is a diagram to which reference is made in explaining the effect of the mask processing. FIG. 11 is a diagram to which reference is made in explaining the zero-value prediction processing and mask processing. The prediction method in the zero-value region predictor 301 will be described with reference to FIGS. 10 and 11. FIG. 11 shows the mask processing in the HL sub-band space as an example. If the position at which the important data of the layer-1 quantized sub-band data is present is predicted on the basis of the layer-2 quantized sub-band data (L2LH, L2HL and L2HH), a component element having a larger value than a certain value is extracted from the layer-2 HL sub-band space 1502, and its coordinates and area are doubled both in the horizontal and vertical directions as shown in FIG. 11. Thus, the position where the component element is present in the layer-1 HL sub-band space 1505 is predicted, and the layer-1 zero-value region prediction data (mask data) E1HL is produced which does not include this predicted position. The mask plane space 506 is formed by the layer-1 zero-value region prediction data E1HL. The region which does not include the predicted position is indicated by the shaded area in the mask plane space 506 as illustrated in FIG. 11. The next mask processing replaces the image data overlapped on the shaded area by zero.

In addition, the same processing is performed on the other layer-2 sub-band spaces (i.e. the LH sub-band space and the HH sub-band space), so that a component element having a larger value than a predetermined value is extracted and that its coordinates and area are doubled in both the horizontal and vertical directions. Thus, by this processing, it is possible to predict the position where the component element is present in the layer-1 LH sub-band space or the layer-1 HH sub-band space to generate the layer-1 zero-value region prediction data (mask data) E1LH or E1HH which indicate the region which does not include the predicted position. The mask plane spaces are formed according to these predicted data.

The same processing is performed on the layer-1, a position where a component element is present in the layer-0 space is predicted on the basis of the layer-1 quantized sub-band data (L1LH, L1HL and L1HH) to generate the layer-0 zero-value region prediction data (E0LH, E0HL and E0HH), so that a mask plane 406 is formed (see FIG. 11). In this case, too, the image data overlapped on the region (shaded area) which does not include the predicted position are replaced by zero in the next mask processing.

When the mask processing is performed as above, the data in the shaded areas are deleted as shown at the lower place of FIG. 10. In FIG. 10, the volume of each cube indicates the amount of data. If such a mask processing is not performed, each layer has a relatively large amount of data and the compressed image data train is also long as shown at the upper place of FIG. 10. Since the data in the shaded areas are treated as zero by the mask processing, only the remaining data make the compressed data train. Thus, since the compressed image data train is short, the compression can be made to a great extent.

By the way, in the normal image which does not include any differential image data, the layer-2 HL sub-band space 1502, the layer-1 HL sub-band space 1505 and the layer-0

HL sub-band space 1508 have correlation. Therefore, the position where data are present in each layer-1 sub-band space can be predicted on the basis of the data of each layer-2 sub-band space, and the position where data are present in each layer-0 sub-band space can be predicted on the basis of the data of each layer-1 sub-band space. If the data stored in the differential accumulation buffer 108 are forcibly all made zero, the decoded restoration LL sub-band signal 177 produced from the differential accumulation buffer 108 becomes zero immediately after that. Thus, the subtraction in the subtracter 109 is substantially ineffective, and the compressed image at that time becomes the common image which does not include any differential image data.

When the differential data of the moving image are compressed, the previous image is stored in the differential accumulation buffer 108. When the previous image data (the decoded restoration LL sub-band signal 177) are output from the differential accumulation buffer 108, the subtraction on the data is performed by the subtracter 109, so that the compressed image includes the differential image data. Even if the compressed image includes the differential image data, the zero-value region prediction data are generated in the same way as in the previous description to form the mask plane space by which the mask processing is performed. A brief description will be made of the operation for the case where the differential data of the moving image are compressed.

a) The first sub-band decomposition processing is performed on the current image by the sub-band decomposer 102a. The low frequency (LL) sub-band data generated by the first sub-band decomposition processing are fed to the subtracter 109, where the previous image read out from the differential accumulation buffer 108 is subtracted from the low frequency (LL) sub-band data. The difference image data are subjected to the second and following sub-band decomposition processing. At the same time, the difference image data are expanded and then are stored in the differential accumulation buffer 108, so that the image stored in the differential accumulation buffer 108 becomes the previous image if the input image is the current image.

b) The differential image data output from the subtracter 109 are supplied to the zero-value prediction compressor 103 to produce the zero-value region prediction data for the mask processing.

c) Each sub-band data other than the low frequency sub-band generated by the first sub-band decomposition processing are masked using the zero-value region prediction data in the zero-value prediction compressor 103 to produce the masked data.

Figure 4:
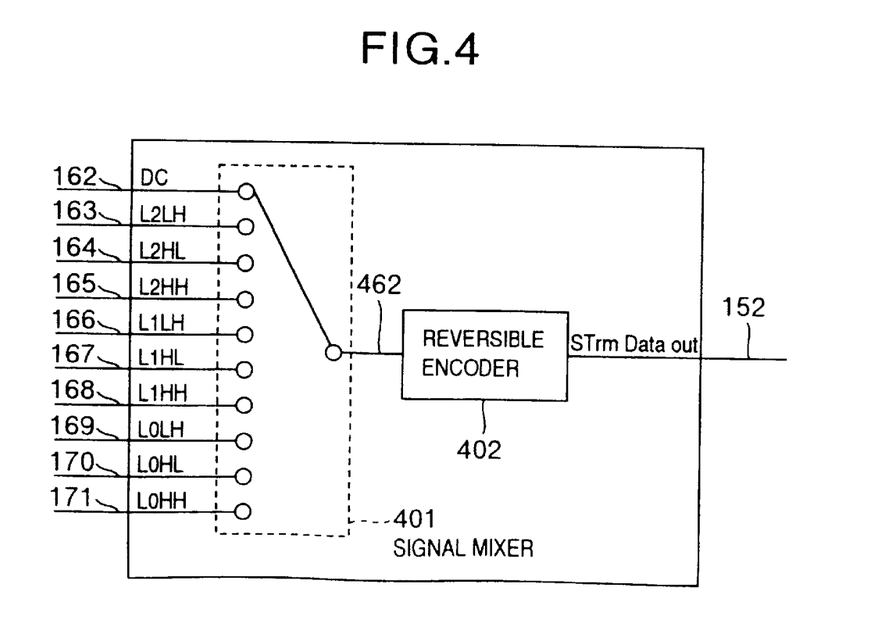
FIG. 4 is a block diagram showing the construction of a VLC device.

Referring back to FIG. 1, the image compression apparatus further comprises a VLC device 104. The construction of the VLC device 104 is shown in detail in FIG. 4. The VLC device 104 includes a signal mixer 401 for mixing each sub-band signal in a time sharing manner, and a reversible encoder 402 for reversibly coding the mixed signal.

Figure 5:
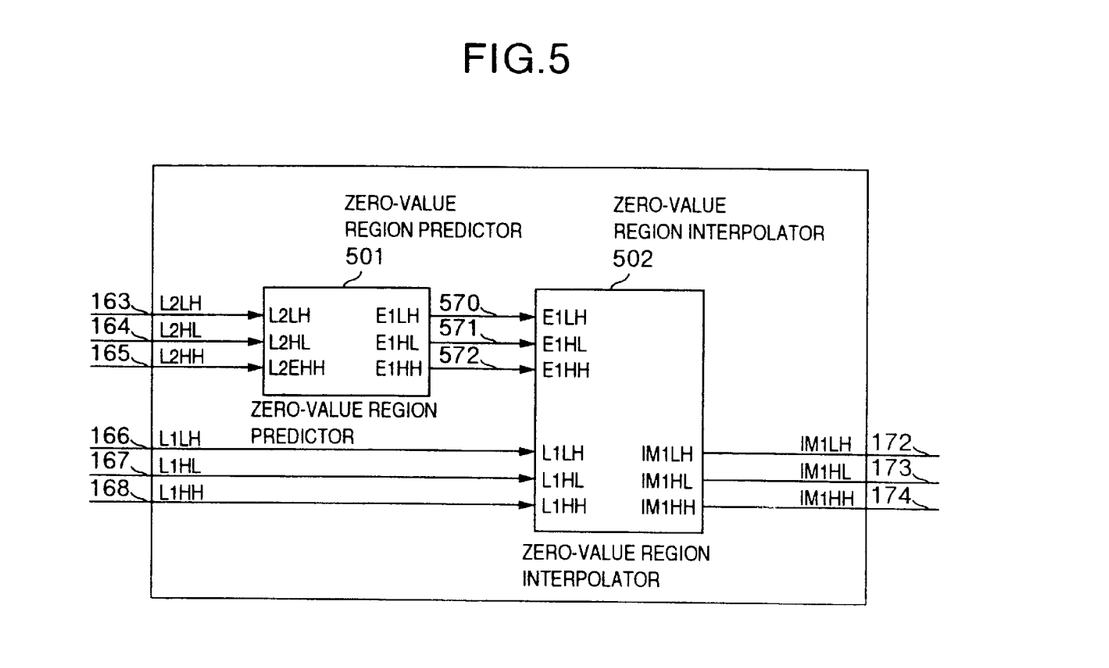
FIG. 5 is a block diagram showing the construction of a zero-value prediction expander.

Referring back to FIG. 1, the image compression apparatus further comprises the zero-value prediction expander 106. The zero-value prediction expander 106 includes, as shown in FIG. 5, a zero-value region predictor 501 and a zero-value region interpolator 502.

Figure 6:
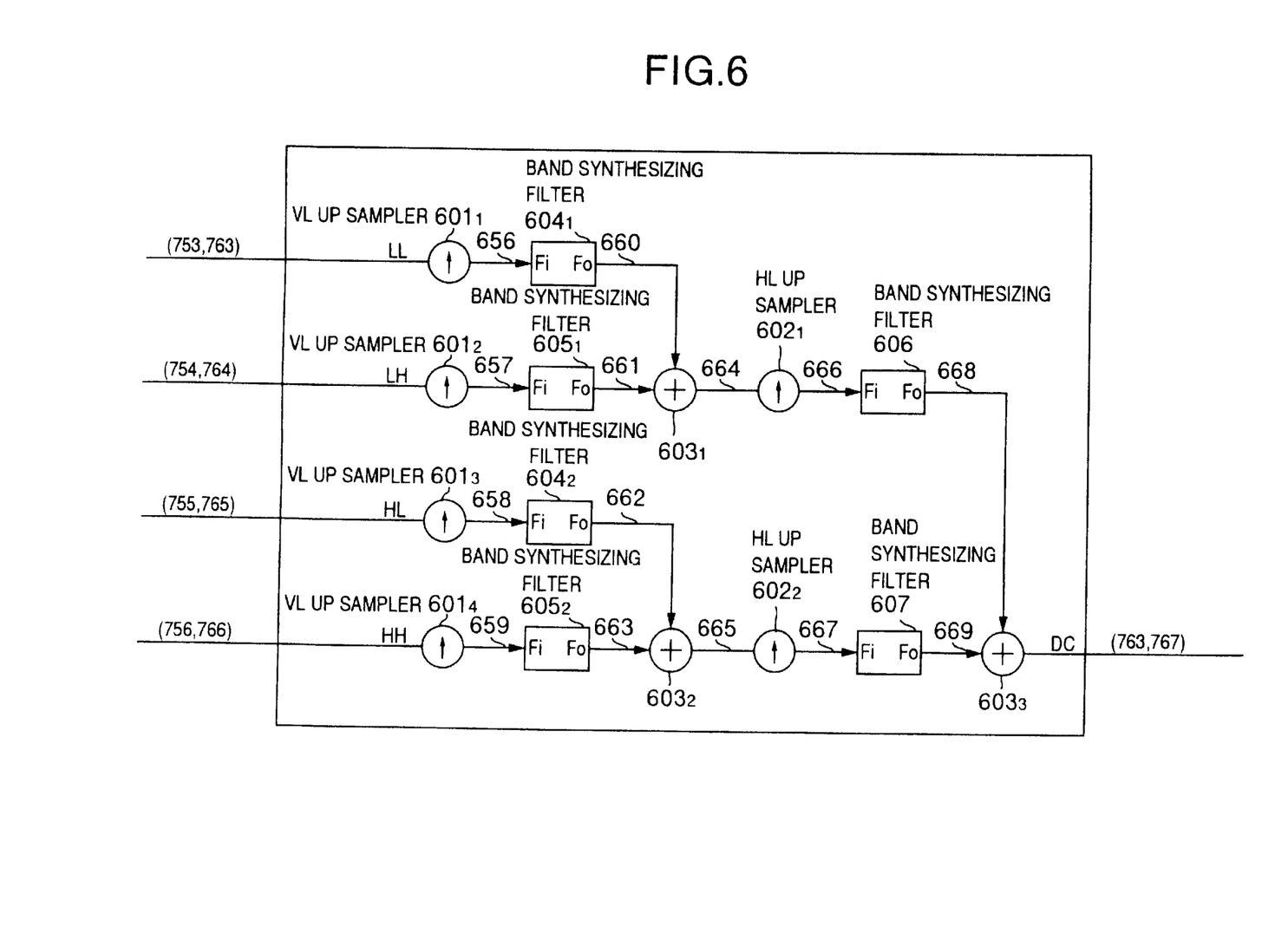
FIG. 6 is a block diagram showing the construction of a two-dimensional sub-band synthesizer.

Referring back to FIG. 1, the image compression apparatus further comprises the two-dimensional sub-band synthesizers 107a and 107b. FIG. 6 is a block diagram showing the construction of each two-dimensional sub-band synthesizer. The synthesizer includes a band synthesizing filter 606 which is designed on the basis of the characteristics of the horizontal low-pass filter 201 (see FIG. 2) in the two-dimensional sub-band decomposer 102, a band synthesizing filter 607 which is designed on the basis of the characteristics of the horizontal high-pass filter 202 (see FIG. 2) in the two-dimensional sub-band divider 102, band synthesizing filters $604_1$ and $604_2$ which are designed on the basis of the vertical low-pass filters $203_1$ and $103_2$ (see FIG. 2), band synthesizing filters $605_1$ and $605_2$ which are designed on the basis of the vertical high-pass filters $204_1$ and $204_2$, (see FIG. 2), horizontal up (HL UP) samplers $602_1$ and $602_2$, vertical up (VL UP) samplers $601_1$ to $601_4$, and adders $603_1$ to $603_3$.

The LL-component sub-band data fed to the synthesizer are processed by the vertical up sampler $601_1$ and the band synthesizing filter $604_1$, and the LH-component sub-band data fed to the synthesizer are processed by the vertical up samplers $601_2$ and the band synthesizing filter $605_1$. The output data 660 of the band synthesizing filter $604_1$ and the output data 661 of the band synthesizing filter $605_1$ are added by the adder $603_1$ to produce horizontal component low frequency sub-band data 664. In addition, the HL-component sub-band data are processed by the vertical up sampler $601_3$ and the band synthesizing filter $604_2$, and the HH-component sub-band data are processed by the vertical up sampler $601_4$ and the band synthesizing filter $605_2$. The output data 662 of the band synthesizing filter $604_2$ and the output data 663 of the band synthesizing filter $605_2$ are added by the adder $603_2$ to produce horizontal component high frequency sub-band data 665. The horizontal low frequency sub-band data 664 are processed by the horizontal up sampler $602_1$ and the band synthesizing filter 606, and the high frequency sub-band data 665 are processed by the horizontal up sampler $602_2$ and the band synthesizing filter 607. The output data 668 of the band synthesizing filter 606 and the output data 669 of the band synthesizing filter 607 are added by the adder $603_3$ to produce two-dimensional data 763 and 767.

Figure 9:
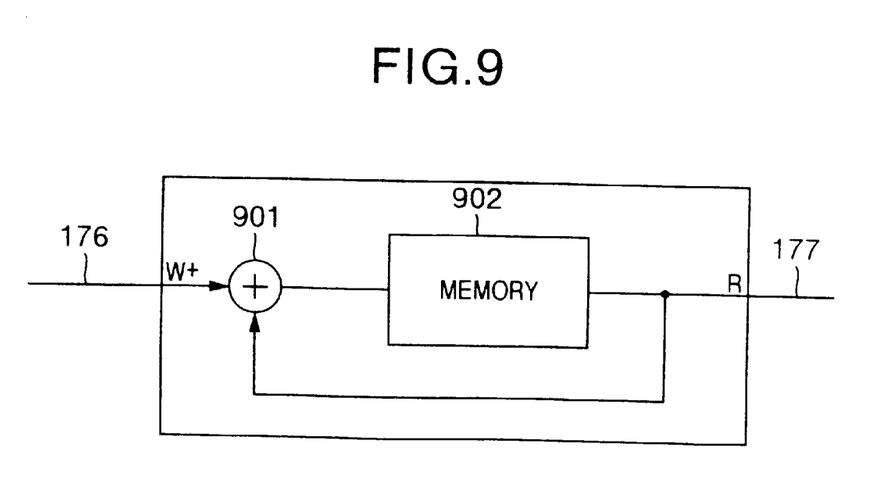
FIG. 9 is a block diagram showing the construction of a differential accumulation buffer.

Referring back to FIG. 1, the image compression apparatus further comprises the differential accumulation buffer 108 which receives a restored DC component signal 176 which is output from the two-dimensional sub-band synthesizer 107b, and adds the signal 176 to the previous data to accumulate the signal 176 one after another. As shown in FIG. 9, the differential accumulation buffer 108 comprises an adder 901 and a two-dimensional memory 902. The restored DC component 176 is a differential input signal. A differential accumulation signal which is read out from the two-dimensional memory 902 is produced as the decoded restoration LL sub-band signal 177. The adder 901 adds the data read from the two-dimensional memory 902 and the restored DC component signal newly inputted from the outside. Data produced from the adder 901 are written in the two-dimensional memory 902. Thus, since the differential image data are added by the adder 901 and then are written in the two-dimensional memory 902, the data stored in the two-dimensional memory 902 are not differential image data but an image signal itself. If the input image is taken as the current image, the differential accumulation buffer 108 always stores the previous image.

Referring back to FIG. 1, the image compression apparatus further comprises the subtracter 109. The subtracter 109 acts as a difference generator for taking the difference between the sub-band low frequency component (i.e. the layer-0 LL sub-band signal 153), which is produced as a result of the first sub-band decomposition processing which is performed by the first-stage two-dimensional sub-band decomposer 102a on the image to be compressed, and the layer-0 LL sub-band signal produced one frame before. The layer-0 LL sub-band signal produced one frame before is the signal output from the differential accumulation buffer 108 (i.e. the decoded restoration LL sub-band signal 177). The processes up to produce the decoded restoration LL sub-band signal 177 in the differential accumulation buffer 108 will be described later in detail.

Figure 7:
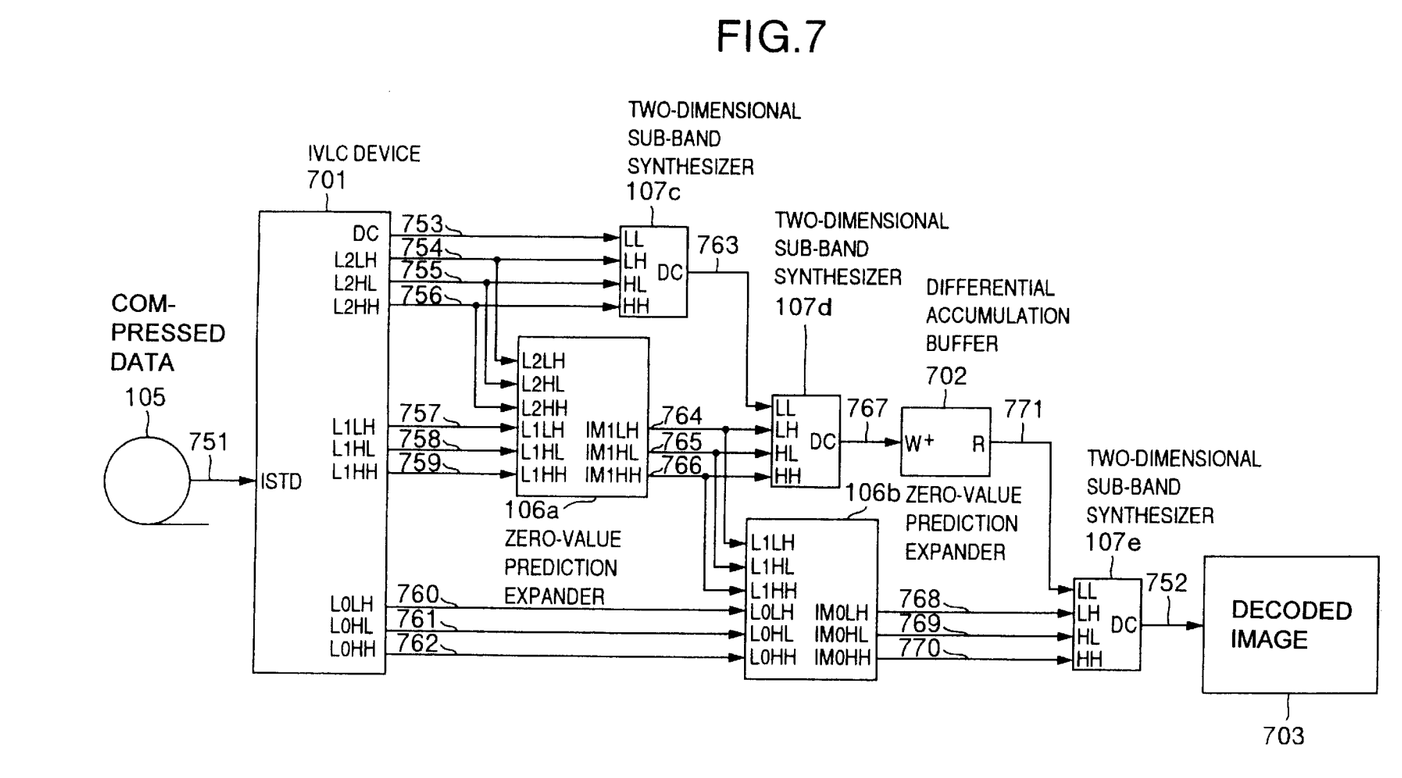
FIG. 7 is a block diagram showing an image expansion apparatus for expanding image data in the image data processing apparatus according to the embodiment of the present invention.
Figure 8:
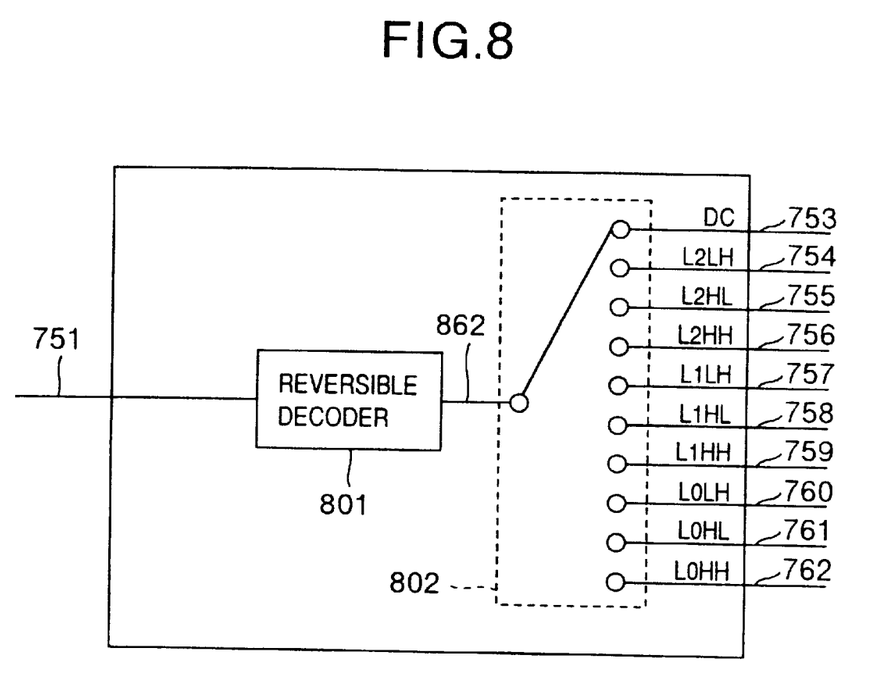
FIG. 8 is a block diagram showing the construction of an IVLC device.

FIG. 7 is a block diagram of an image expander for expanding the image data in the image data processing apparatus according to the embodiment of the present invention. The image expander comprises an IVLC device 701, a differential accumulation buffer 702 which has the same construction as the differential accumulation buffer 108 in the previously given image compressor, zero-value prediction expanders 106*a* and 106*b* each of which has the same construction as the zero-value prediction expander 106 in the previously given image compressor, and two-dimensional sub-band synthesizers 107*c*, 107*d* and 107*e* each of which has the same construction as the two-dimensional sub-band synthesizer 107*a* or 107*b* in the previously given image compressor.

A compressed data signal 751 is fed to the image expander and a decoded image signal 752 is expanded by the image expander. In FIG. 7, there are shown compressed data 105 and a decoded image 703.

A layer-2 LL sub-band signal 753, a layer-2 LH sub-band signal 754, a layer-2 HL sub-band signal 755, a layer-2 HH sub-band signal 756, a layer-1 LH zero-value region prediction sub-band signal 757, a layer-1 HL zero-value region prediction sub-band signal 758, a layer-1 HH zero-value region prediction sub-band signal 759, a layer-0 LH zero-value region prediction sub-band signal 760, a layer-0 HL zero-value region prediction sub-band signal 761, and a layer-0 HH zero-value region prediction sub-band signal 762 are output from the IVLC device 701.

A restored DC component difference signal 763 is output from the two-dimensional sub-band synthesizer 107*c*.

A layer-1 LH restored sub-band signal 764, a layer-1 HL restored sub-band signal 765, and a layer-1 HH restored sub-band signal 766 are output from the zero-value region prediction expander 106*a*. A restored DC component difference signal 767 is output from the two-dimensional sub-band synthesizer 107*d*.

A layer-0 LH restored sub-band signal 768, a layer-0 HL restored sub-band signal 769, and a layer-0 HH restored sub-band signal 770 are output from the zero-value region prediction expander 106*b*. A restored DC component signal 771 is output from the differential accumulation buffer 702.

The operation of the image data processing apparatus according to the embodiment will be described in detail. Referring back to FIG. 1, if the input image 101 is supplied, the layer-0 sub-band signals 153 to 156 are produced from the image data 151 in the first-stage two-dimensional sub-band decomposer 102*a*.

In the subtracter 109, the difference LL sub-band signal 157 is produced by subtracting the layer-0 LL sub-band signal of the previous frame, which is reproduced by the decoder, from the LL sub-band signal 153.

In the second-stage two-dimensional sub-band decomposer 102*b*, the layer-i sub-band signals 158 to 161 are produced from the difference LL sub-band signal 157. In the third-stage two-dimensional sub-band decomposer 102*c*, the layer-2 sub-band signal 162 to 165 are produced from the LL sub-band signal 158.

In the zero-value prediction compressor 103, the layer-1 zero-value region prediction sub-band signals 166 to 168 and the layer-0 zero-value region prediction sub-band signals 169 to 171 are produced from the sub-band signals 154, 155, 156, 159, 160, 161, 163, 164 and 165 other than the LL sub-band signals 153, 158 and 162.

In the VLC device 104, the compressed signal 152 is produced from the layer-2 sub-band signal 162 to 165, the layer-1 zero-value region prediction sub-band signals 166 to 168 and the layer-0 zero-value region prediction sub-band signals 169 to 171.

At the same time, in the zero-value prediction expander 106, the restored sub-band signals 172 to 174 other than the layer-1 LL sub-band are produced from the layer-2 sub-band signals 163 to 165 other than the layer-2 LL sub-bands and the layer-1 zero-value region prediction sub-band signals 166 to 168.

In the two-dimensional sub-band synthesizer 107*a*, the layer-2 restored DC component signal 175 is produced from the layer-2 sub-band signals 162 to 165.

In the two-dimensional sub-band synthesizer 107*b*, the restored DC component signal 176 is produced from the layer-2 restored DC component signals 172 to 175 of each sub-band.

In the differential accumulation buffer 108, the decoded restoration LL sub-band signal 177 is produced from the restored DC component signal 176.

Thus, the image compression is performed by the three-stage wavelet transform.

The variable length compressed image data 105 is decoded as follows. The compressed signal 751 is, as shown in FIG. 7, fed to the IVLC device 701 to generate the layer-2 sub-band signals 753 to 756, the layer-1 zero-value region prediction sub-band signals 757 to 759 other than the LL sub-band, and the layer-0 zero-value region prediction sub-band signals 760 to 762 other than the LL sub-band.

In the zero-value prediction expander 106*a*, the layer-1 restored sub-band signals 764 to 766 are produced from the layer-2 sub-band signals 754 to 756 other than the LL sub-band and the layer-1 zero-value region sub-band signals 757 to 759 other than the LL sub-band.

In the zero-value prediction expander 106*b*, the layer-0 restored sub-band signals 768 to 770 are produced from the layer-1 restored sub-band signals 764 to 766 other than the LL sub-band and the layer-0 sub-band signals 760 to 762 other than the LL sub-band which are output from the IVLC device 701.

At the same time, in the two-dimensional sub-band synthesizer 107*c*, the first restored DC component difference signal 763 is produced from the layer-2 sub-band signals 753 to 756 which are output form the IVLC device 701.

In the two-dimensional sub-band synthesizer 107*d*, the second restored DC component difference signal 767 is produced from the first restored DC component difference signal 763 and the layer-1 restored sub-band signals 764 to 766 other than the LL sub-band.

In the differential accumulation buffer 702, the first decoded restoration LL sub-band signal 771 is produced from the second restored DC component signal 767.

In the two-dimensional sub-band synthesizer 107*e*, the decoded restored image signal 752 is produced from the decoded restoration LL sub-band signal 771 and the layer-0 restored sub-band signals 768 to 770 other than the LL sub-band.

Thus, the image expansion is performed by the three-stage wavelet transform.

According to the embodiment, the zero value in the high frequency component is predicted by considering the correlation between the low frequency component and the high frequency component, and the mask processing is performed, so that the amount of the coded data can be greatly reduced, and that the compression rate can be increased.

Since the sub-band data to be masked and the mask data are both produced by the difference relative to the previous image, both data have high correlation, and the moving picture is also effectively masked. Thus, the amount of data can be greatly reduced.

a) The wavelet transform is performed, the DC image is compressed and transmitted, and the DC image is expanded. The data are stored in the buffer for generating the next difference image data. The buffer always has the previous image stored.

b) The mask data for mask processing is generated from the interframe DC difference image which is produced by the subtraction between the current DC image (expanded) and the previous DC image read out from the buffer.

c) The sub-band image of the previous image read out from the buffer is subtracted from the data of each sub-band other than DC image, so that the interframe sub-band difference image data can be produced.

d) The interframe sub-band difference image data are masked by the mask data, and the masked data are compressed and transmitted.

As explained above, according to the image data processing apparatus and method of the present invention, the zero value in high frequency component is predicted and the mask processing is carried out, so that the amount of data is greatly reduced by the mask processing and that data can be compressed at a high rate.

Further, the moving picture is also decomposed into sub-bands before performing the subtraction to the previous image, so that it can be separated into the low frequency (LL) sub-band data and the high frequency sub-band data, and the mask data are produced only from the low frequency (LL) sub-band data. Therefore, the mask data are precise and the mask processing can be kept effective.

What is claimed is:

1. An image data processing method comprising the steps of:
    predicting a meaningful space of a high frequency sub-band from a low frequency sub-band signal of a wavelet space;
    performing zero-value region interpolation by assigning data compressed by a wavelet transform to only said meaningful space predicted by said zero-value region prediction;
    performing a plurality of stages of sub-band synthesis of wavelet-transformed compressed data;
    adding a low frequency difference sub-band signal produced by said sub-bad synthesis and previous data to accumulate the resultant data in a differential accumulation buffer; and
    performing sub-band synthesis on a decoded restoration low frequency sub-band signal read out from said differential accumulation buffer and a high frequency sub-band signal produced by said zero-value region interpolation.

2. An image data processing apparatus comprising:
    a zero-value region predictor having means for predicting a meaningful space of a high frequency sub-band from a low frequency sub-band signal of a wavelet space; and
    a zero-value region masking device for masking data in a space of said high frequency sub-band other than said meaningful space predicted by said zero-value region predictor, wherein:
    said zero-value region predictor performs a zero-value region prediction of data in a higher high frequency sub-band space from data in a low frequency sub-band space when a certain element in said low frequency sub-band space is larger than a predetermined value, and said zero-value region predictor predicts a region, which includes coordinates obtained by horizontally and vertically expanding plurality times coordinates in which said certain element is present, as coordinates in which an effective element in said high frequency sub-band space is present.

3. An image data processing apparatus according to claim 2, wherein when a certain element in said low frequency sub-band space is larger than a predetermined value, said zero-value region predictor predicts a region, which includes coordinates obtained by horizontally doubling and vertically doubling coordinates in which said element is present, as coordinates in which an effective element in a next high frequency sub-band space is present.

4. An image data processing apparatus comprising:
    a first sub-band decomposer for performing a first sub-band decomposition on an image to be compressed, and sub-band decomposes for performing second and following decomposition;
    a zero-value region predictor having means for predicting a meaningful space of a high frequency sub-band from a low frequency sub-band signal of a wavelet space;
    a zero-value region masking device for masking data in a space other than said meaningful space predicted by said zero-value region predictor;
    a variable length encoder for encoding data output from the final stage sub-band decomposer of said sub-band decomposers and data of a high frequency sub-band masked by said zero-value region masking device;
    sub-band synthesizer for restoring a low frequency difference sub-band signal on the basis of said data output from the final stage sub-band decomposer and said data of the high frequency sub-band masked by said zero-value region masking device;
    a differential accumulation buffer for receiving said low frequency difference sub-band signal restored by said sub-band synthesizer, and adding said low frequency difference sub-band signal to previous data to accumulate said low frequency difference sub-band signal one after another; and
    a difference device for making a difference between a decoded restoration low frequency sub-band signal read out from said differential accumulation buffer and a low frequency sub-band signal output from said first sub-band decomposer,
    a difference sub-band low frequency component signal output from said difference device being supplied to said sub-band decomposer for performing the second sub-band decomposition.

5. An image data processing apparatus comprising:
    a first sub-band decomposer for performing a first sub-band decomposition on an image to be compressed, and sub-band decomposes for performing second and following decomposition;
    a zero-value region predictor having means for predicting a meaningful space of a high frequency sub-band from a low frequency sub-band signal of a wavelet space;

a zero-value region masking device for masking data in a space other than said meaningful space predicted by said zero-value region predictor;

a variable length encoder for reducing the amount of information of all data by assigning more information to data, which occurs at higher rate, of data output from the final stage sub-band decomposer of said sub-band decomposers and of data output from said zero-value region masking device;

a zero-value region interpolator for assigning the data output from said zero-value region masking device to only the meaningful space predicted from the data which are output from said final stage sub-band decomposer;

a differential accumulation buffer for receiving a low frequency difference sub-band signal restored on the basis of the data output from said final stage sub-band decomposer and data output from said zero-value region interpolator, and adding said low frequency difference sub-band signal to previous data to accumulate said low frequency difference sub-band signal one after another; and a difference device for making a difference between a decoded restoration low frequency sub-band signal read out from said differential accumulation buffer and a low frequency sub-band signal output from said first sub-band decomposer, a difference sub-band low frequency component signal output from said difference device being supplied to said sub-band decomposer for performing the second sub-band decomposition.

6. An image data processing apparatus comprising:

a plurality of sub-band synthesizers for performing sub-band synthesis to data compressed by a wavelet transform;

a zero-value region interpolator having means for assigning the data compressed by the wavelet transform to only a meaningful space predicted by said zero-value region predictor; and a differential accumulation buffer for receiving a low frequency difference sub-band signal output from said sub-band synthesizers, and adding said low frequency difference sub-band signal to previous data to accumulate said low frequency difference sub-band signal one after another, a decoded restoration low frequency sub-band signal read out from said differential accumulation buffer being supplied to one of said sub-band synthesizers, thereby restoring an original image.

7. An image data processing method comprising the steps of:

performing first sub-band decomposition on an image to be compressed;

performing sub-band decomposition on a sub-band low frequency component produced by said first sub-band decomposition to produce sub-band image data, and compressing said sub-band image data;

restoring a low frequency sub-band signal for next difference image data from said image data of the sub-band low frequency component produced by said sub-band decomposition and other image data of each sub-band, and storing said restored low frequency sub-band signal in a differential accumulation buffer;

performing subtraction between said current image data of the sub-band low frequency component produced by said first sub-band decomposition and previous image data of the sub-band low frequency component read out from said differential accumulation buffer;

performing second and following sub-band decomposition on a difference sub-band low frequency component produced by said subtraction;

generating mask data for masking process from difference sub-band low frequency component image data;

masking sub-band data other than said sub-band low frequency component produced by the first sub-band decomposition at a current time using said mask data to mask data in a space other than a meaningful space; and compressing said masked data.

* * * * *